Figure 1:
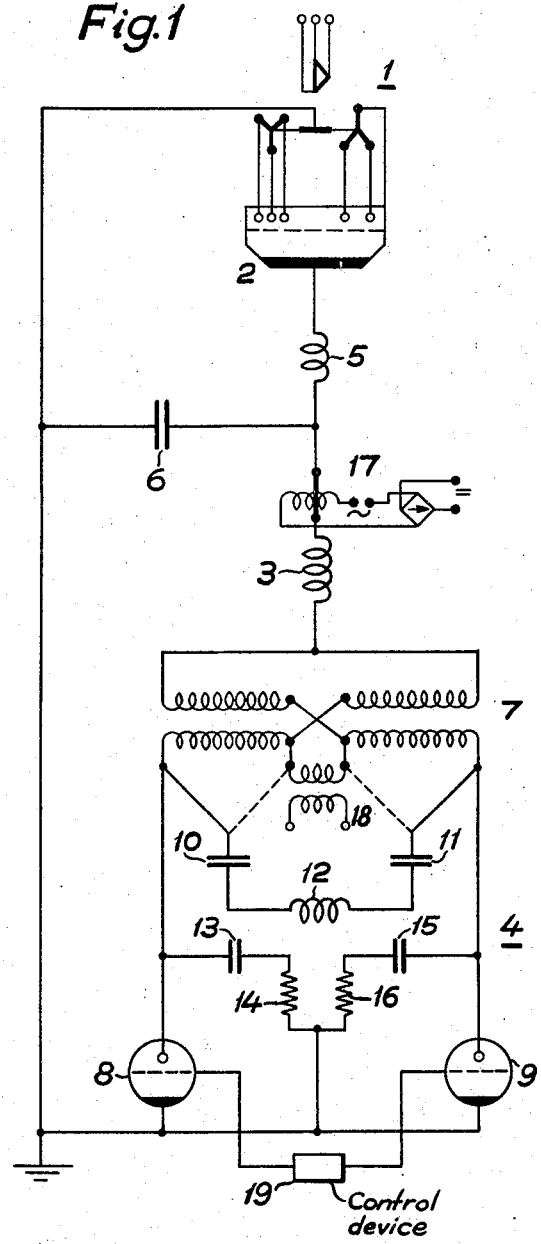

Nov. 14, 1967   H. FORSSELL   3,353,096
TEST APPARATUS FOR CONTROLLED RECTIFIERS OPERATING
AS PART OF AN INVERTER CIRCUIT

Filed Jan. 30, 1963   2 Sheets-Sheet 1

INVENTOR.
Harry Forssell
BY
Bailey, Stephens & Huettig

United States Patent Office 3,353,096
Patented Nov. 14, 1967

3,353,096
TEST APPARATUS FOR CONTROLLED RECTIFIERS OPERATING AS PART OF AN INVERTER CIRCUIT
Harry Forssell, Ludvika, Sweden, assignor to Allmänna Svenska Elektriska Aktiebolaget, Vasteras, Sweden, a corporation of Sweden
Filed Jan. 30, 1963, Ser. No. 254,866
Claims priority, application Sweden, Feb. 5, 1962, 1,222/62
7 Claims. (Cl. 324—26)

The present invention relates to a means of testing mercury arc rectifiers, preferably for high power.

Such a testing is made in two steps. For the first the test rectifiers under test are inserted in a testing means where the rectifiers are operated and loaded to a degree which is at least equally as severe as during normal operation. During said testing measurements may be made in order to check and count any rectifier faults such as arc-backs and arc-throughs. After such a testing, which takes a rather long time, the rectifiers are taken to pieces in order to check the worn-out state of the different parts of the rectifiers.

As mercury arc rectifiers today have reached such a degree of development that the arc-faults are rather few, the hard loading of the rectifiers and the subsequent checking of the worn-out state are often regarded as the most important part of the rectifier testing. It is therefore very important that the rectifiers are tested at heavy load and especially with high commutation currents.

It is an object of the invention to provide a loading circuit for testing rectifiers while the control means for checking the rectifier faults occurring during the testing may be on any kind known per se.

Ionic rectifiers were hitherto generally tested by means of rectifier equipment and an inverter, in which power from an alternating current network was transmitted through the rectifier equipment and the inverter and back to the network.

Since the latest developments within the rectifier technique are leading to even higher power and thus larger units and consequently also larger ionic rectifiers, the testing of large rectifiers will demand an extremely heavy duty network which, with the greater units, may be difficult to achieve in places where the ionic rectifiers are produced, quite apart from the fact that testing is normally carried out in a converter with a pulse number of 3, which, even in a heavy duty network gives rise to unpleasant harmonics.

This difficulty is circumvented by means of the present invention wherein ionic rectifiers are tested by inserting the rectifier under test as one of the rectifiers in an inverter connected to an oscillation circuit and fed from a direct voltage source the voltage of which is at least one order of magnitude smaller than the rated voltage of the test rectifier, with a direct current corresponding to the rated current of the test rectifier, which oscillation circuit is so dimensioned that the amplitude of the oscillation voltage at an inverter frequency corresponding to the frequency of the oscillation circuit itself exceeds the desired test voltage.

In order to obtain a testing direct current corresponding to the rated current of the test rectifier, it is clear that the resultant resistance of the D.C. circuit formed by said direct voltage source, said inverter and said oscillation circuit may not exceed the ratio between the voltage of said direct voltage source and the rated current of the test rectifier.

According to the invention said oscillation circuit comprises an oscillation reactor and an oscillation capacitor and, in order to obtain the desired amplitude of said oscillation voltage, the impedance of said oscillation capacitor at the natural frequency of said oscillation circuit must exceed the ratio between the maximum desired test voltage and the rated current of the test rectifier.

As later explained the natural frequency of said oscillating circuit has to be less than the operational frequency of said inverter in order to obtain commutation currents of a certain magnitude in the inverter.

The inverter may suitably be a one-way, two-pulse inverter where both the rectifiers are rectifiers under test. Since the inverter does not produce any power but operates with the oscillating energy in the oscillation circuit, the test equipment will take up only that power to cover the losses, and since no power is fed back to the network this will not be loaded with undesired harmonics and the frequency of the inverter may be chosen independent of the frequency of the network. This means that the test frequency may be chosen considerably higher than the conventional network frequency and, since the testing of ionic rectifiers must be extended over rather a long time due to the haphazard occurrence of the rectifier faults in order to produce a detectable amount of wear on the rectifier, the saving in time with the increased test frequency can be considerable.

As mentioned above, the inverter is fed with a direct current corresponding to the rated current of the rectifiers under test, from a direct voltage source the voltage of which is at least one order of magnitude smaller than the rated voltage of the test rectifiers. Since, however, the direct voltage source need only deliver a power corresponding to the losses in the equipment, the direct voltage may be relatively low and usually several powers of ten under said rated voltage.

Figure 2:
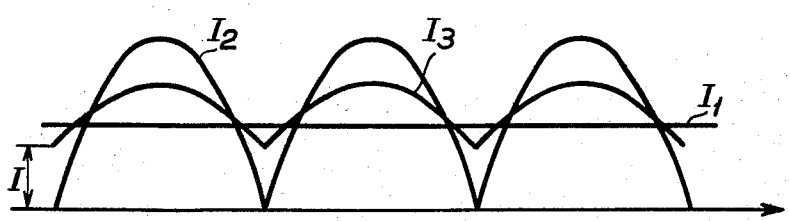
Figure 3:
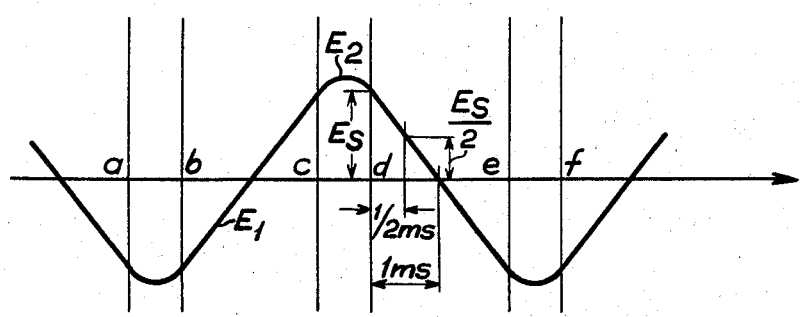

The invention will be further described with reference to the accompanying drawing, where FIGURE 1 shows equipment for testing ionic rectifiers for high power according to the principle of the invention, while FIGURES 2 and 3 show voltage and current relations over the different components in the equipment.

FIGURE 1 shows a one-way, two-pulse inverter 4, comprising two ionic rectifiers 8 and 9 and interphase transformer 7. In theory any type of inverter may be used for the purpose, but by using a one-way inverter it is possible to insure that the rectifier cathodes have zero potential. Since the inverter does not have to deliver any output power, the inverter transformer can in this case be reduced to the interphase transformer 7 as shown. The interphase transformer has four windings, pairwise series-connected and pairwise parallel-connected and arranged on a common iron core and the purpose and function of this transformer is to ensure equal currents in its parallel-connected windings by means of the mutual inductance between said windings. In the commutation circuit between the two ionic rectifiers 8 and 9 is inserted an oscillation capacitor, in this case for reasons of symmetry divided into two capacitors 10 and 11 and a commutation reactor 12. When testing several ionic rectifiers, both the rectifiers 8 and 9 could be rectifiers under test but it is of no importance for the function of the whole equipment whether one or both rectifiers are being tested.

The inverter is fed from a direct voltage source in the form of a rectifier 2 for instance a single-way, six-pulse rectifier fed from a rectifier transformer 1. For smoothing the direct current from the rectifier 2 a smoothing reactor 5 and a smoothing capacitor 6 have been inserted. Further, the inverter is provided with a control device 19 of known type. Said control device delivers control pulses to the grids of the rectifiers 8 and 9 and the operation frequency of the inverter is thus determined by the frequency of said control pulses.

The oscillation circuit necessary for the device comprises an oscillation reactor 3 and the two oscillation capacitors 10 and 11. The last mentioned capacitors, together with the commutation reactor also form an oscillation circuit.

In order to explain the operation, it is assumed, for example, that the ionic rectifier 8 is conducting and the ionic rectifier 9 blocked, whereby the direct current from the rectifier 2 flows through the oscillation reactor 3 and at the interphase transformer divides into two parts which, due to the mutual inductance between the parallel windings of this transformer, will be equal in size and one of which flows directly from the interphase transformer to the anode of the rectifier 8 while the other flows through the capacitors 10 and 11 and the commutation reactor 12 before flowing to the anode in the rectifier 8. Thus the capacitors 10 and 11 will be charged. At a certain moment before the capacitors have become fully charged, the rectifier 9 receives an ignition pulse, whereby a commutation current grows up in the commutation circuit comprising the rectifier 9, rectifier 8, capacitors 10 and 11 and commutation reactor 12. The purpose of the commutation reactor 12 is to limit the derivative of the commutation current to a desired value and it is thus often suitable to make the commutation reactor adjustable. The ignition of the rectifier 9 thus causes the current in the three components, capacitors 10 and 11 and commutation reactor 12, to be reversed.

In order to explain the further operation of the equipment, reference is made to FIGURE 2 which shows the current in the oscillation reactor 3. If the oscillation reactor and oscillation capacitor were infinitely great this current would be constant as shown by the curve $I_1$. Apart from this being theoretically impossible, it may be said that for practical reasons it is desirable to make the oscillation reactor and oscillation capacitor as small and thus as cheap as possible or, in other words, to obtain the frequency of the oscillation circuit consisting of oscillation reactor and oscillation capacitors as high as possible to decrease the costs on these two components which, for equipment for ionic rectifiers for high power, must in any case be rather large. In order to get some idea of how small said components may be made, an inverter may be imagined operating with a frequency corresponding to the frequency of the oscillation circuit itself. This would mean that the commutation would take place at the moment when the capacitors 10 and 11 have become fully charged and the current in the capacitor has thus decreased to zero. This means that the commutation will take place at zero current and thus instantaneously. The current in the oscillation reactor 3 would thus have the curve form as shown by the curve $I_2$ in FIGURE 2.

Such a current would, however, be of no value for testing ionic rectifiers since commutation at zero current gives the most favourable working conditions for ionic rectifiers and would therefore not indicate any faults in ionic rectifiers neither in the form of arc-faults nor in the wearing of the rectifiers. If the rectifier test is to be of any value the current magnitude at the end of the commutation must have a value which is not below the corresponding value at the rectifiers in practical operation. The oscillation reactor and oscillation capacitors must thus be so large that the frequency of the oscillation circuit does not exceed the desired test frequency. The current in the oscillation reactor must therefore have a curve form as shown by $I_3$ in FIGURE 2, where the least value I at commutation is so large that the commutation time at desired current derivative will be of the order of magnitude of $10^{-4}$ seconds.

In order to still further explain the operation of the device reference is made to FIGURE 3 which shows the voltage over the capacitors 10 and 11. This voltage is built up of two sine-shaped voltages $E_1$ and $E_2$ having different frequencies. The intervals $a$–$b$, $c$–$d$ and $e$–$f$ represent commutations while the intervals $b$–$c$, $d$–$e$, etc., represent the periods between the commutations when only one rectifier is conducting. The frequency of the voltage $E_1$ will therefore correspond to the frequency of the oscillation circuit comprising the oscillation reactor 3, capacitors 10 and 11 and commutation reactor 12, while the frequency of the voltage $E_2$ will correspond to the frequency of the oscillation circuit formed by the capacitors 10 and 11 and the commutation reactor 12.

As mentioned earlier, increased frequency in the inverter gives a shorter testing time for the rectifiers. Another advantage of this is that the oscillation frequency for the oscillation circuit comprising oscillation reactor and oscillation capacitor, which according to the above must be lower than the inverter frequency, may be chosen higher at higher inverter frequency. Thus the relatively high inverter frequency involves a saving in dimensions of the oscillation reactor and oscillation capacitor. How high it is possible to choose the test frequency will be clear from the following.

Experience has shown that backfiring most frequently occurs in an ionic rectifier about half a millisecond after the end of the commutation. In other words, at this moment there must be a relatively high blocking voltage on the ionic rectifier just extinguished, which means that the capacitor-charging and thus the capacitor voltage at this moment must be relatively high. It is estimated that said capacitor voltage should not be below half the blocking voltage at the end of the commutation. In FIGURE 3 this is indicated by making the blocking voltage at the moment $d$ equal to $E_s$, and the blocking voltage half a millisecond after this moment has been estimated as equal to ½$E_s$. A rough approximation would show that this corresponds to a zero passage of the capacitor voltage at least one millisecond after the end of the commutation. From FIGURE 3 it is thus seen that the period length for the capacitor voltage composed of the voltages $E_1$ and $E_2$ should not be less than four milliseconds plus two commutation times. If, thus, the commutation time is estimated to 0.1 millisecond, the maximum permitted frequency of the inverter will be 240 cycles per second.

If this frequency is exceeded the likelihood of backfiring will decrease accordingly, but despite this it may be justifiable to increase said frequency to some extent as long as the likelihood of backfiring does not decrease to such a degree so that the value of the test is decreased. It is thus clear that the frequency of the inverter should be chosen higher than the conventional network frequency, which is usually 50 or 60 cycles per second, but not higher than the order of magnitude 250 cycles per second. Further, it is clear that the dimensions of oscillation reactor and oscillation capacitors should be chosen so small that the frequency of the oscillation circuit itself, with a reasonable margin, lies as near the frequency of the inverter as possible, i.e. that there is a reasonable current value left at commutation, as has been mentioned in the description of FIGURE 2. In order to achieve further variation possibilities with the test, the oscillation capacitor should be adjustable, at least within a certain range.

As is clear from the above description, the equipment contains two oscillation circuits, one of which, an outer oscillation circuit, comprises the oscillation reactor 3 and oscillation capacitors 10 and 11 and the commutation reactor 12, while the other, the inner oscillation circuit, comprises the commutation circuit with the capacitors 10 and 11 and the commutation reactor 12. When dimensioning these components, in the first place the commutation reactor should be dimensioned with respect to the current derivative desired at commutation. The inductance thus determined will be in series with the oscillation reactor 3 so that the latter may be reduced by an amount corresponding to the size of the commutation reactor. It should, however, be observed that the oscillation reactor and the commutation reactor will operate as a voltage divider for the oscillation capacitors 10 and 11. Because only half the current from the oscillation reactor flows through the commutation reactor and because the current direction is altered, only one fourth of the commutation reactor in relation to the oscillation reactor will be included in said voltage divider. In order to utilize reasonably the capacitor voltage, the commutation reactor must not take up too great a part of this. The commutation reactor therefore should not take up more than half the capacitor voltage, which is to say that the oscillation reactor should not be less than one fourth of the commutation reactor. Generally it can be said that a reasonable relation is obtained if the oscillation reactor is at least of the same order of magnitude as the commutation reactor.

In order with the given average current to obtain the desired voltage on the capacitor, i.e. a voltage corresponding to the maximum voltage of the test rectifier, the impedance of the oscillation capacitor at the resonance frequency of the oscillation circuit must be greater than the ratio between the maximum voltage and average current of the rectifier under test.

As mentioned earlier, control of the inverter is carried out with the help of a grid control device 19 of known type. This control device may be arranged entirely separate from the equipment and have its own reference voltage and control impulse source, but in such a connection it is simpler to let the control device receive its impulses depending on the voltage variations occurring in the connection. In FIGURE 1, therefore, a measuring transductor 17 has been shown inserted in the direct current conductor to the oscillation reactor and a voltage transformer 18 which may be connected by intermediate terminals on the interphase transformer 7 as shown in FIGURE 1, or over the capacitors 10 and 11. The output magnitude from these measuring devices may suitably be used for controlling the grid control device 19 so that the control pulses may be given in dependence on the current and voltage in the inverter. As more of the components of the oscillation circuits and thereby the natural frequencies of these, as earlier mentioned, could be made variable, and as the commutation time is dependent on the commutation voltage and current of the inverter, and as the lower limit of the operation frequency of the inverter is given from said natural frequencies, it is desirable to adjust the operation frequency of the inverter according to said current and voltage so that it is desirable to have said current and voltage values available in the control device 19.

To limit the magnitude of the voltage arising across an extinguishing rectifier the rectifiers could suitably be parallel-connected by a damping circuit, as illustrated in FIGURE 1, comprising capacitors 13 and 15 respectively and resistances 14 and 16 respectively.

In FIGURE 1 the oscillation capacitor is shown with unbroken lines as connected to end terminals of the interphase transformer. However, it may also be connected to intermediate terminals as illustrated with dotted lines. In either event, the transformers are connected between the legs of the inverter 4. The interphase transformer then also functions as an auto transformer and the impedances in the commutation circuit must be adapted to the ratio of this transformer.

I claim:

1. Means for testing a mercury arc rectifier, comprising three components, namely an inverter having at least two rectifiers and an interphase transformer comprising a winding for each of said rectifiers, each rectifier being connected in series with its respective interphase transfromer winding to form the respective legs of the inverter, a direct voltage source and an oscillatory circuit; said oscillatory circuit comprising an oscillatory reactor and an oscillatory capacitor; said inverter fed from said direct voltage source, said oscillatory reactor being connected in series between the direct voltage source and the inverter, said oscillatory capacitor being connected between the legs of the inverter; said three components forming a closed circuit; said windings and their rectifiers being connected in parallel to each other to said direct voltage source; the rectifier under test being inserted as one of the rectifiers of said inverter; the voltage of said direct voltage source being at least one order of magnitude lower than the rated voltage of the rectifier under test; the resultant resistance of the D.C. circuit formed by the above three components not exceeding the ratio between the voltage of said direct voltage source and the rated current of said rectifier under test; the impedance of said oscillatory capacitor at the natural frequency of said oscillatory circuit exceeding the ratio between the maximum desired testing voltage and the rated current of said rectifier under test; said inverter being provided with a control device delivering control pulses to the control grids of the rectifiers of said inverter at a frequency corresponding to an operation frequency of said inverter exceeding the natural frequency of said oscillatory circuit.

2. Means for testing a mercury arc rectifier as claimed in claim 1; said inverter being operated with a frequency higher than the frequency of that network for which said mercury arc rectifier is intended; said inverter operated with a frequency lower than about 250 cycles per second.

3. Means for testing a mercury arc rectifier as claimed in claim 1; said oscillation capacitor being variable.

4. Means for testing a mercury arc rectifier as claimed in claim 1; said inverter further including commutation reactor means for obtaining a suitable magnitude of the commutation current; said commutation reactor means being variable.

5. Means for testing a mercury arc rectifier as claimed in claim 1; said oscillation reactor being at least of the same order of magnitude as said commutation reactor.

6. Means for testing a mercury arc rectifier as claimed in claim 1; said inverter further including a damping circuit for each of the rectifiers of the inverter; said damping circuit being connected in parallel with the corresponding rectifier.

7. Means for testing a mercury arc rectifier as claimed in claim 1; said testing means further including measuring transformers for measuring voltage and current in said oscillation circuit; said control device being connected to said measuring transformers.

References Cited

UNITED STATES PATENTS

| 2,929,013 | 3/1960 | McNamel | 331—128 X |
| 3,117,272 | 1/1964 | Quinn | 331—128 X |

FOREIGN PATENTS

| 120,608 | 4/1958 | Russia. |

RUDOLPH V. ROLINEC, *Primary Examiner.*

WALTER L. CARLSON, *Examiner.*

EDWARD L. STOLARUN, C. F. DUFFIELD,
*Assistant Examiners.*